PANORAMIC RECEIVERS OR THE LIKE

Filed Jan. 27, 1958 2 Sheets-Sheet 1

MARCUS A. McCOY

*INVENTOR.*

BY [signature]

HIS ATTORNEY

PANORAMIC RECEIVERS OR THE LIKE

Filed Jan. 27, 1958 2 Sheets-Sheet 2

MARCUS A. McCOY
*INVENTOR.*

*BY* [signature]

HIS ATTORNEY

United States Patent Office 2,994,766

Patented Aug. 1, 1961

2,994,766

PANORAMIC RECEIVERS OR THE LIKE

Marcus A. McCoy, Reseda, Calif., assignor to Hoffman Electronics Corporation, a corporation of California Filed Jan. 27, 1958, Ser. No. 711,293
4 Claims. (Cl. 250—20)

This invention is related to panoramic receivers and, more particularly, to an improved panoramic receiver which will exhibit a high probability of discernment of an intermittent signal the frequency of which lies somewhere between the limits of reception of the panoramic receiver.

The degree of probability of interception by a panoramic receiver of a particular intermittent signal the frequency of which lies somewhere within the frequency range of the receiver may be considered to be proportional to the frequency of recurrence of the intermittent signal and inversely proportional to the presence of other signals within the range of detections of the receiver. Up to the present time little, if any, progress has been made to increase substantially the probability of intercept of an intermittent signal by panoramic receiving apparatus.

Therefore, it is an object of the present invention to provide an improved panoramic receiver.

It is a further object of the present invention to provide a new and useful panoramic receiver which will exhibit a high degree of intercept probability for a particular intermittent signal in a crowded frequency band.

According to the present invention a conventional superheterodyne panamoric receiver employs at least two local oscillators which supply frequency varying, tracked, heterodyning signals to be mixed with incoming signal. The variation in frequency of these two heterodyning signals is controlled by and proportional to the amplitude of the horizontal-sweep sawtooth wave supplied a conventional, frequency-calibrated, cathode ray tube associated with the panoramic receiver. The cathode ray tube display will exhibit a plurality of uniquely spaced pulse indications the center pulse indication being situated on the display at the frequency of the intermittent signal. The degree of multiplicity of pulse indications observed will thus increase in direct proportion to the degree of probability of intercept of the detected signal by the panoramic receiver.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 5 is a digrammatic representation of a cathode ray tube display of a detected intermittent signal as received by the panoramic receiver circuit of FIGURE 4.

Figure 1:
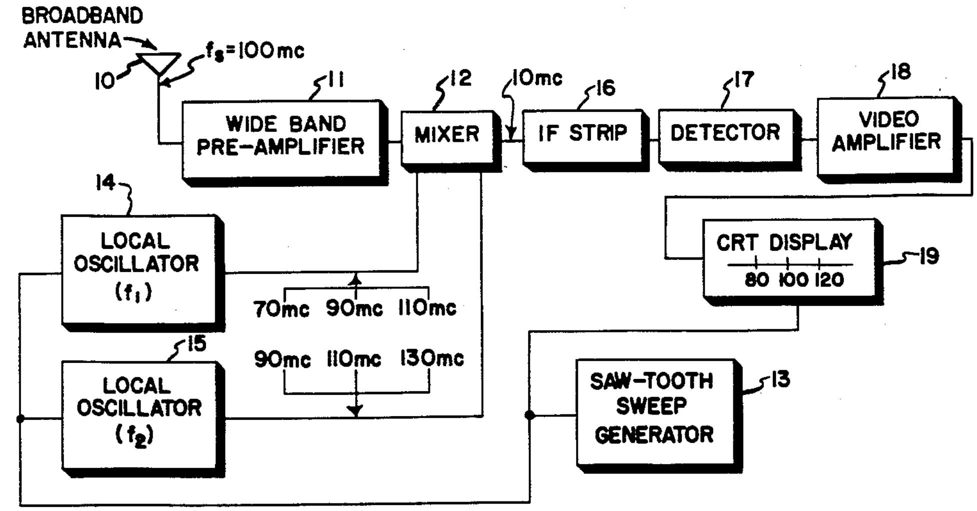
FIGURE 1 is a block diagram of a first embodiment of a panoramic receiver according to the present invention.

In FIGURE 1 broad band antenna 10 is coupled through wide-band pre-amplifier 11 to a first input circuit of mixer 12. Sawtooth sweep generator 13 is coupled to the tuned circuitries of local oscillators 14 and

15 (containing electrically controlled inductors, condensers, or the like) the output signals from which are coupled to second and third input circuits of mixer 12. The output signal from mixer 12 is coupled through I.-F. strip 16, and subsequently through detector 17 and video amplifier 18 to the vertical input of cathode ray tube display device 19. Sawtooth sweep generator 13 is also coupled to the horizontal sweep circuit of C.R.T. display device 19.

The circuit in FIGURE 1 consisting of broad-band antenna 10, wide-band amplifier 11, mixer 12, I.-F. strip 16, detector 17, video amplifier 18, and cathode ray tube 19 operates in a conventional manner and requires no further discussion. Of particular importance with respect to the present invention, however, is the interrelation of cathode ray tube 19, sawtooth sweep generator 13, local oscillators 14 and 15, and mixer 12. Let it be assumed that I.-F. strip 16 has an extremely narrow pass band with center frequency of 10 megacycles and that the incoming signal has a frequency $f_s$ of 100 megacycles. In addition, let it be assumed that there is always a 20 megacycle spacing between the frequencies of the signals generated by local oscillators 14 and 15, that there is a linear relationship between the progression in frequencies of local oscillators 14 and 15 and the calibration of cathode ray tube 19, and that the electron beam of cathode ray tube 19 will always impinge upon the cathode ray tube face plate in such a fashion that the calibration indication in frequency will be midway in value between the frequencies of the signals generated by local oscillators 14 and 15. When local oscillators 14 and 15 are generating signal frequencies $f_1$ and $f_2$ of 70 megacycles and 90 megacycles, respectively, the difference frequency signal from the output of mixer 12 resulting from the mixing of the input signal having the frequency $f_s$ equaling 100 megacycles and the 90 megacycle signal frequency from local oscillator 15 will be 10 megacycles and, hence, will pass through I.-F. strip 16 and the remaining stages to appear as a pulse indication at the cathode ray tube face plate at the 80 megacycle point on the calibration. If the frequencies of the signals generated by local oscillators 14 and 15 are 90 megacycles and 110 megacycles, respectively, the two difference frequency signals from mixer 12 as provided by the mixing of the input 100 megacycle signal and the 90 megacycle and the 110 megacycle signals will each be a 10 megacycle signal, and, assuming proper phase relations to exist, will add to produce in fact one 10 megacycle signal having twice the normal amplitude, which will appear at the 100 megacycle calibration point on cathode ray tube 19. When the signals generated by local oscillators 14 and 15 have frequencies of 110 megacycles and 130 megacycles, the 110 megacycles signal will be mixed with the 100 megacycle input signal to produce a difference frequency signal of 10 megacycles and, hence, pass through I.-F. strip 16 and the subsequent stages to produce a visual pulse indication at the 120 megacycle point on the calibration etched upon cathode ray tube 19.

Figure 2:
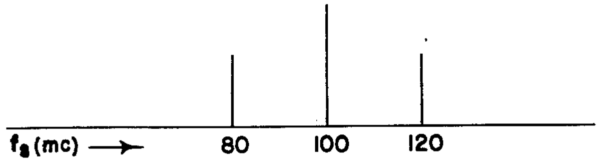
FIGURE 2 is a diagrammatic representation of a cathode ray tube display of an intermittent signal as received by the panoramic receiver of FIGURE 1.

The complete visual indication will appear as three pulse indications, as shown in FIGURE 2. It is noted that the amplitude of the pulse indication at the 100 megacycle frequency point is twice the amplitude of the pulse indications at the 80 megacycle point and the 120 megacycle point. As has been explained, this doubling in amplitude is due to the fact that the difference frequencies arising from mixing of the 100 megacycle input signal with the 90 megacycle and 110 megacycle oscillator signals are additive in effect, consequently producing a pulse indication at cathode ray tube 19 of twice the usual magnitude. It follows that in addition to aiding the operator in detecting a signal by reason of showing three pulse indications on the cathode ray tube instead of just one, the precise frequency of the signal being detected may be readily determined by noting the pulse indication having the highest magnitude and a position in the center of the two reference pulse indications. If local oscillators 14 and 15 both operate at a low-power level, then, whether the incoming signal is relatively weak or strong, the relative pulse magnitudes of the center and side pulses shown in FIGURE 2 will remain susbtantially the same.

It should be mentioned in passing that difference frequency signals will also be produced in the case of a second input signal having a frequency of either 80 megacycles or 120 megacycles. However, such a signal will be reflected in the output pulse indication appearing at cathode ray tube 19 really as an increase or heightening of the pulse amplitude either at the 80 megacycle point or the 120 megacycle point. It should also be mentioned that the additive effect of the difference frequency signals at the 100 megacycle point, taking the aforementioned frequency values as an illustration, will in effect aid in providing a more successful resolution of signals having a close frequency spacing.

Figure 3:
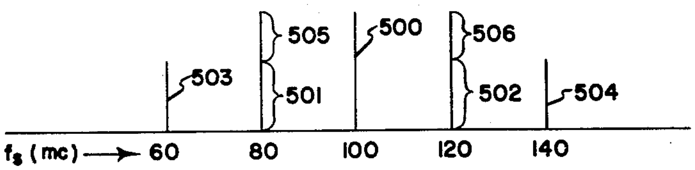
FIGURE 3 is a block diagram of a second embodiment of a panoramic receiver according to the present invention.
Figure 3:
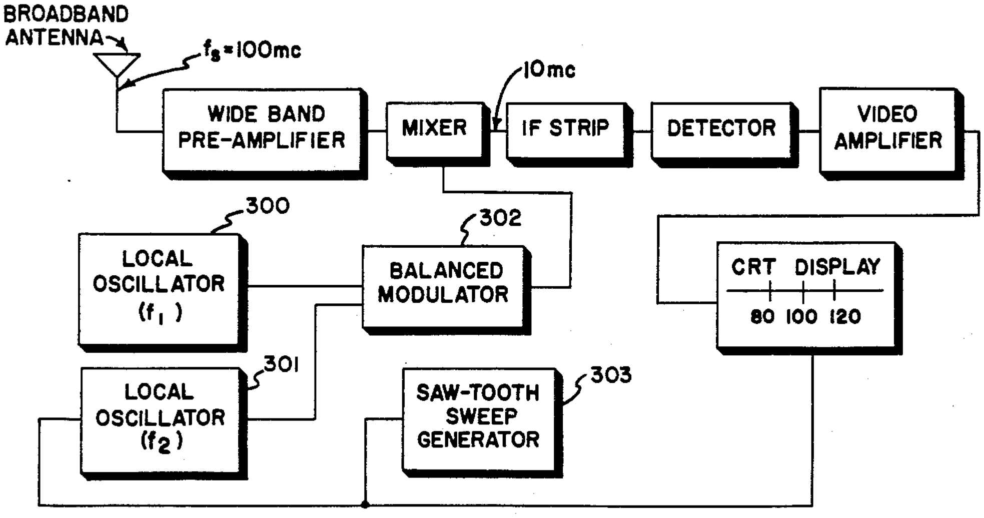

In FIGURE 3 the panoramic receiver's circuit as shown is identical to the circuit of FIGURE 1 with the exception that local oscillator 300 has a fixed frequency and is coupled together with local oscillator 301 through balanced modulator 302 to the receiver mixer stage.

The circuit shown in FIGURE 3 operates as follows. Consider the frequency of the signal generated by local oscillator 300 to be 10 megacycles. Consider further that local oscillator 301 is swept by sawtooth sweep generator 303 in such a manner that the frequency of local oscillator 301 is always equivalent to the electron beam indication of the cathode ray tube 19 with respect to frequency. Then, when local oscillator 301 is generating a signal the frequency of which is 80 megacycles, the frequencies of the sum and difference signals from balanced modulator 302 will be 70 megacycles and 90 megacycles. Correspondingly, signal frequencies of 90 megacycles and 110 megacycles will be present in the output from balanced modulator 302 when local oscillator 301 is generating a signal the frequency of which is 100 megacycles. And similarly, the signal frequencies of 110 megacycles and 130 megacycles will be present in the output signal from balanced modulator 302 when local oscillator 301 is generating a signal the frequency of which is 120 megacycles. Hence, the end result will be that the cathode ray tube display will appear as shown in FIGURE 2, which of course is the same type of display attributed to the circuit shown in FIGURE 1.

Of course it may be desirable to increase the probability of intercept of the panoramic receiver still further, by providing on the cathode ray tube display more pulse indications. This result may be attained by using the circuitry of FIGURE 4.

Figure 4:
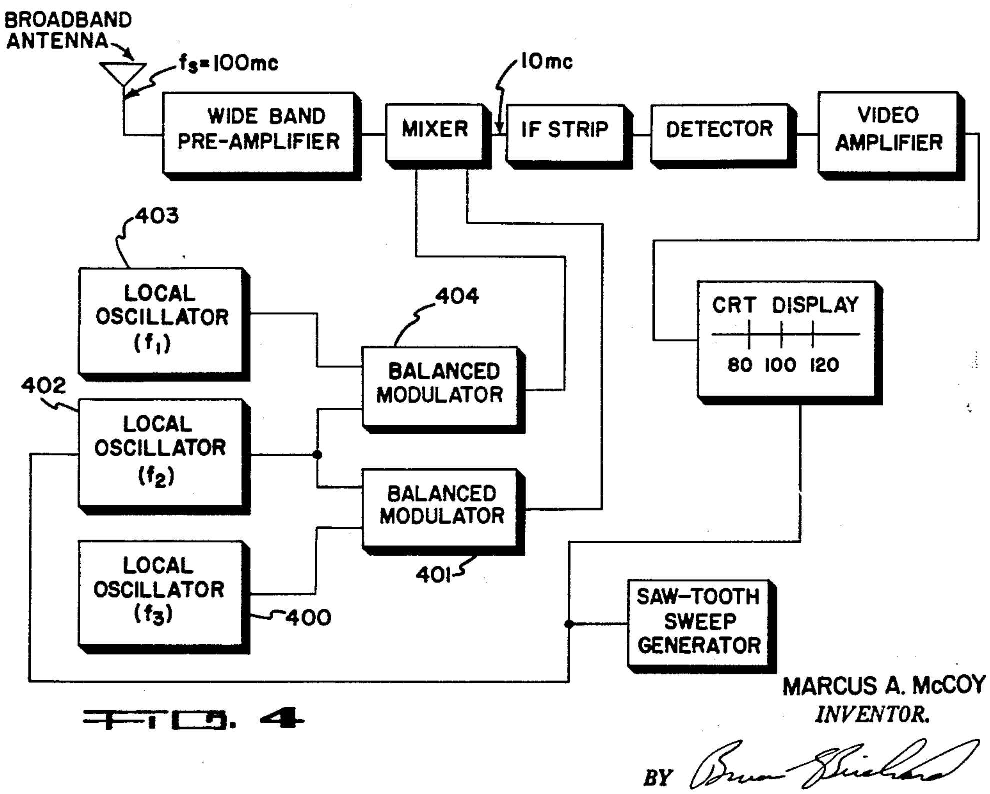
FIGURE 4 is a block diagram of a third embodiment of a panoramic receiver according to the present invention.

In FIGURE 4 the circuitry is identical with that of FIGURE 3 with the exception of the inclusion of local oscillator 400 and its connection to a second balanced modulator 401, to which local oscillator 402 is also connected, the output from balanced modulator 401 being coupled to the panoramic receiver mixer stage. Assume that the frequency of the signal generated by local oscilator 403 is 10 megacycles, the signal frequency from local oscillator 400 is 30 megacycles, and the signal frequency from local oscillator 402 is being swept in accordance with the electron beam frequency indication on the cathode ray tube display. The interaction of local oscillator 403, local oscillator 402, and balanced modulator 404 will be the same as described in FIGURE 3, and will produce pulse indications 500, 501, and 502, as shown in FIGURE 5. But the beat frequency signal from balanced modulator 401 will in turn supply pulse indications to the cathode ray tube calibration when the frequency of local oscillator 402 is 60 megacycles, 80 megacycles, 120 megacycles and 140 megacycles. Hence, pulse indications 503 and 504 of normal height occur at 60 and 140 megacycles, and pulses 505 and 506 of increased height occur at the 80 megacycle and 120 megacycle points.

It is seen from FIGURE 5 that the degree of probability of intercept of an intermittent signal has increased 67% over the probability of intercept of the circuits of FIGURES 1 and 3. However, it is apparent that in the case of the circuit of FIGURE 4 the exact frequency of the signal detected is not so easily determined, since pulses having amplitudes equal to the center frequency amplitude appear on either side of the 100 megacycle pulse indication. However, this may be a comparatively unimportant objection when considered in the light of the relatively high increase intercept probability of the panoramic receiver. If desired, this objection may be overcome by switching off one or more oscillators so as to provide a single frequency indication on the cathode ray tube. It must, of course, be understood that further local oscillators and balanced modulators may be cascaded, as indicated in FIGURE 4, to attain the degree of intercept probability desired.

From the foregoing embodiments and the discussion relating thereto, it is apparent that this invention does provide a useful method of obtaining a high degree of intercept of an intermittent signal with a panoramic receiver properly designed, and such design will in addition aid in signal resolution and prominence of the pulses to be studied.

While particular embodiments of the invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A panoramic receiving system, for multiple display of each received signal, including a wide band preamplifier, a mixer coupled to said amplifier and having at least one heterodyning signal input circuit, an I.-F. amplifier coupled to said mixer, detector means coupled to said I.-F. amplifier for producing an output signal, a source of a plurality of frequency-spaced simultaneously existent and simultaneously controllable heterodyning signals such source having frequency-control-signal input terminals, and heterodyning signal output terminals coupled to said heterodyning signal input circuit of said mixer; a cathode ray tube having an intelligence-signal input circuit coupled to said detector means and a sweep signal input circuit; and a sweep signal generator circuit coupled to said sweep signal input circuit of said cathode ray tube and to said frequency control signal input terminals of said source, said source being responsive to such sweep signals to produce frequency-spaced simultaneous heterodyning signals varying in frequency at any instant at the same rate and in the same direction.

2. Apparatus according to claim 1 in which said mixer has first and second heterodyning-signal input circuits, and said source includes first and second staggered-range variable-frequency local oscillators each having an output circuit coupled to a respective one of said first and second heterodyning-signal input circuits of said mixer, and each having a frequency control input circuit coupled to said sweep generator, whereby said oscillators are differently responsive in output frequency to the signals from said sweep generator.

3. Apparatus according to claim 1 in which said source includes a balanced modulator having first and second input circuits and an output circuit coupled to said heterodyning-signal input circuit of said mixer, a first local oscillator exhibiting a signal of fixed frequency and coupled to said first input circuit of said balanced modulator, a second but variable frequency local oscillator having a frequency control input circuit coupled to said sweep generator and an output circuit coupled to said second input circuit of said balanced modulator.

4. Apparatus according to claim 1 in which said mixer has first and second heterodyning signal input circuits, said source comprises first and second balanced modulators each having a first input circuit, a second input circuit, and an output circuit coupled to a respective one of said first and second heterodyning-signal input circuits of said mixer, first and second fixed-frequency local oscillators each coupled to a respective one of said first input circuit of said first and second balanced modulators, and a variable-frequency local oscillator having a frequency control input circuit coupled to said sweep generator and an output circuit coupled to both of said second input circuits of said first and second balanced modulators.

References Cited in the file of this patent

UNITED STATES PATENTS

| | | |
|---|---|---|
| 2,460,900 | Newbold | Feb. 8, 1949 |
| 2,484,618 | Fisher | Oct. 11, 1949 |
| 2,525,679 | Hurvitz | Oct. 10, 1950 |
| 2,538,068 | Williams | Jan. 16, 1951 |
| 2,614,214 | Perlow et al. | Oct. 14, 1952 |